United States Patent [19]

Duethman

[11] 4,424,890
[45] Jan. 10, 1984

[54] MANUAL CLUTCH WEAR ADJUSTER

[75] Inventor: Michael R. Duethman, Vadnais Heights, Minn.

[73] Assignee: Chrysler Corporation, Highland Park, Mich.

[21] Appl. No.: 306,797

[22] Filed: Sep. 29, 1981

[51] Int. Cl.³ .............................................. F16D 13/75
[52] U.S. Cl. ................................. 192/111 A; 192/99 S
[58] Field of Search .................. 192/111 A, 99 S; 74/512, 501.5; 188/196 B

[56] References Cited

U.S. PATENT DOCUMENTS

| 2,872,830 | 2/1959 | Hinsey | 74/512 |
| 3,430,745 | 3/1969 | Randol | 192/111 A |
| 3,621,959 | 11/1971 | Gale et al. | 192/111 A |
| 4,066,154 | 1/1978 | Ross | 192/111 A |
| 4,227,603 | 10/1980 | Fasano | 74/512 X |
| 4,310,086 | 1/1982 | Mochida | 192/111 A |
| 4,326,616 | 4/1982 | Mochida et al. | 192/111 A |

FOREIGN PATENT DOCUMENTS 2073352 4/1980 United Kingdom ........... 192/111 A

Primary Examiner—Rodney H. Bonck
Assistant Examiner—James J. Merek
Attorney, Agent, or Firm—Newtson and Dundas

[57] ABSTRACT

A clutch actuator assembly is provided which includes an adjuster mechanism carried with the clutch pedal for permitting adjusting movement of the clutch actuator cable during movement of the clutch to its engaged position.

1 Claim, 2 Drawing Figures

U.S. Patent   Jan. 10, 1984   4,424,890
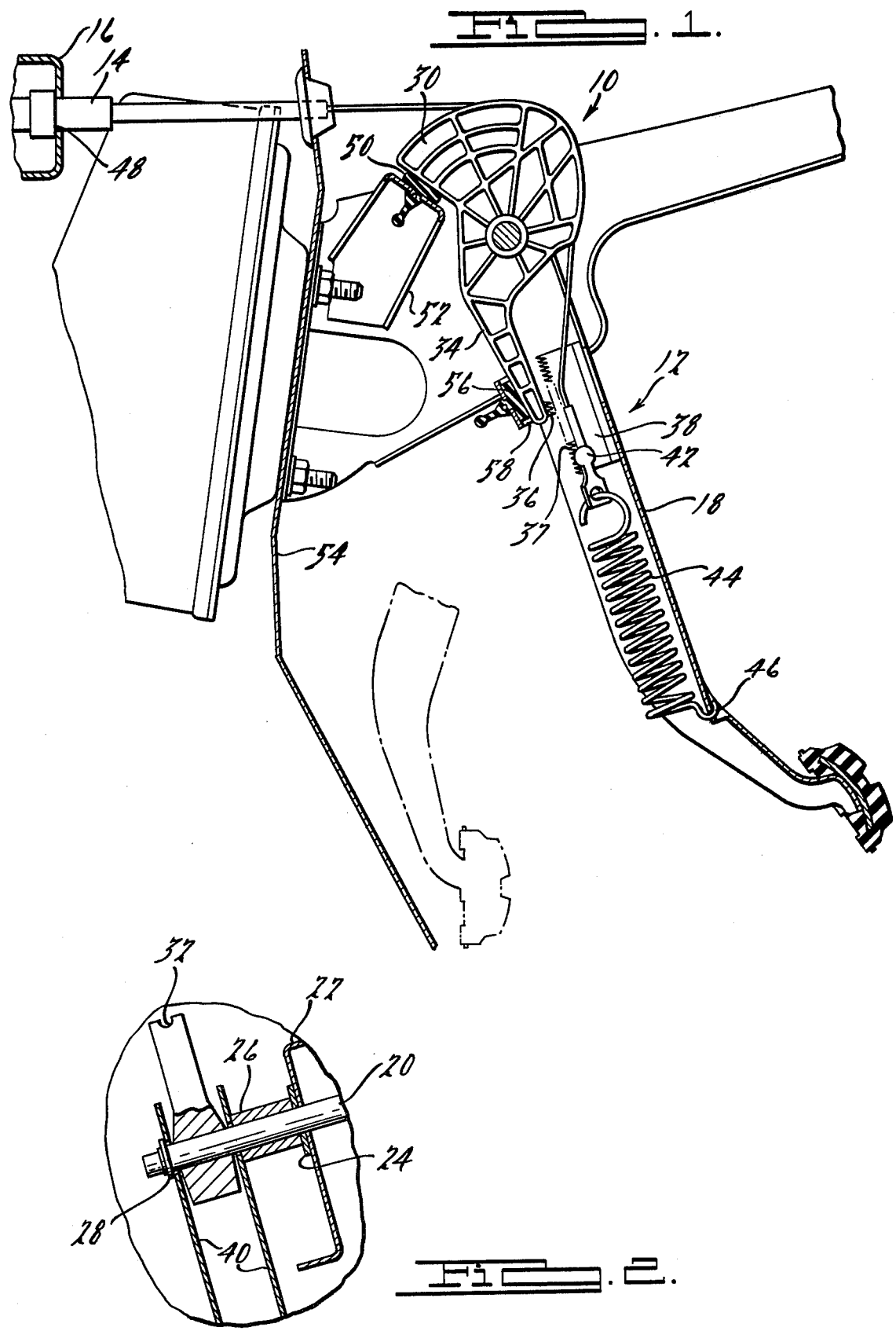

MANUAL CLUTCH WEAR ADJUSTER

BACKGROUND OF THE INVENTION

1. Field of the Invention

The present invention relates generally to actuation mechanisms for motor vehicle clutches and more particularly to such mechanisms which employ wear compensating devices.

2. Description of the Prior Art

Wear compensating clutch actuation mechanisms which have been employed heretofore in the automotive industry have been generally complicated and expensive to manufacture. The need to compensate for wear in friction clutches is well-known, but efforts to fill this need have employed relatively expensive mechanism such as spring loaded pawls and arcuate ratchets such as illustrated in U.S. Pat. Nos. 3,621,959 and 4,181,209.

SUMMARY OF THE INVENTION

Responsive to the deficiencies of the prior art the present invention provides a simple adjusting member slidably carried in the clutch pedal and normally balanced between clutch release forces and a pedal spring load to position itself to compensate for wear. Sliding movement is advantageously prevented during clutch disengagement through cooperation of the adjusting member and an actuating member carried within the pedal.

BRIEF DESCRIPTION OF THE DRAWINGS

In the accompanying drawing

FIG. 1 is a partial cross sectional view of the clutch actuator assembly of the present invention; and FIG. 2 is a cross sectional view of the mounting arrangement of the pedal assembly of the present invention.

DESCRIPTION OF THE PREFERRED EMBODIMENT

Turning now to the drawings, the invention clutch actuator assembly 10 is illustrated as generally comprising an adjusting pedal assembly 12 which operates a cable assembly 14 to actuate a known clutch assembly 16 through which an automotive transmission may be conventionally mechanically disconnected from the engine of a vehicle.

The pedal assembly 12 is illustrated as comprising a pedal arm 18, formed as a channel member of generally U-shaped cross section as may best be seen in FIG. 2, pivotally mounted on a shaft 20 which is fixed to a portion of an automobile body as indicated at 22. A washer 24 and spacer 26 position the pedal arm 18 on the shaft 20 and a conventional locking ring 28 is used to retain pedal arm 18 on the shaft 20 as may best be seen in FIG. 2.

The pedal assembly further comprises an actuator member 30 mounted within the pedal arm 18 for pivotal movement therewith about the shaft 20 as may best be seen in FIG. 2. The actuator 30 includes a guide groove 32 which engages the cable 14. This guide groove 32 is formed in a cam-like portion of the actuator 30. An arm portion 34 is also formed in the actuator 30 extending generally axially downwardly (as viewed in FIG. 1) along the pedal arm 18. The arm 34 includes a plurality of teeth 36 positioned to face interiorly of the pedal arm 18. A complementary array of teeth 37 are formed on a rack-like adjusting member 38 slidably mounted between the interior walls 40 of the pedal arm 18. One end 42 of the cable assembly 14 is fixed to this adjusting member 38, which is in turn fixed in one end of a coil spring 44 which is grounded to the pedal assembly 18 as at 46. The other end 48 of cable assembly 14 is fixed to the clutch assembly 16 in a conventional manner (not shown) whereby drawing the cable 14 in tension by operation of the pedal assembly 12 overcomes actuating spring forces in the clutch assembly 16 to effect separation.

Pivotal movement of the actuator 30 with respect to the vehicle body is limited by a positioning stop 50 carried on brackets 52 mounted in the vehicle body as on the firewall 54, and pivotal movement of the actuator 30 with respect to the pedal 18 is limited by a positioning stop 56 carried in a strap member 58 mounted on the pedal arm 18.

OPERATION OF THE PREFERRED EMBODIMENT

The drawing depicts in FIG. 1 the preferred arrangement of the components of the invention clutch actuator assembly 10 in their normal, clutch engaged position. Forces imposed on cable assembly 14 by the engaged clutch assembly 16 are balanced by the force exerted by the spring 44 acting to draw the cable 14 around the actuator member 30, which is in abutting relationship with the stop 50. The complementary teeth 36,37 of the actuator 30 and adjusting member 38, respectively, are preferably spaced from each other in this clutch engaged position, but may, in fact, be engaged under a light preload.

Upon depressing the clutch pedal 18 the teeth 37 of adjusting member 38 first engage the teeth 36 of the adjuster 30 to hold the adjusting member axially fast with respect to the pedal 18. Further depressing the pedal 18 releases the clutch 16 in the conventional manner against its actuation force, taking up the cable 14 with mechanical advantage over the actuator 30 as the actuator 30 pivots about the shaft.

Upon releasing the pedal 18 clutch return forces pull the pedal assembly 12 pivotally first to the position wherein the stop 50 is contacted by the actuator 30. The pedal 18 then pivots further to the position shown in FIG. 1 operatively disengaging the teeth 36,37 so that the adjusting member 42 is free to slide axially within the pedal 18 to a position wherein the forces imposed on it by the clutch 16 through the cable 14 and by the spring 44 are balanced. It will be clear to those skilled in the art that this position will vary as the clutch 16 wears, tending to move the adjusting member 42 generally upwardly as viewed in FIG. 1 within the pedal 18.

While only one embodiment of the invention clutch actuator assembly has been described, it will be appreciated by those skilled in the art that others may be possible without departing from the scope of the appended claims.

What is claimed is:

1. A clutch actuator assembly for a motor vehicle clutch of the type being normally resiliently loaded to an engaged position effecting power transfer between the engine and transmission of the vehicle, the clutch actuator assembly comprising:

A. a pedal member having a generally U-shaped cross-section pivotally mounted in the vehicle and defining an elongated longitudinal axis;

B. a cable assembly including a cable fixed at one end to the vehicle clutch;

C. a rack-like adjuster member axially slidably received within said pedal member U-shaped cross-section for slidable movement along said pedal member longitudinal axis and including means for attachment to the other end of said cable;

D. axially resilient means in the form of a coil tension spring received within said pedal member U-shaped cross section and aligned on said longitudinal axis with said spring's one end fixed to said adjusting member and said spring's other end grounded to said pedal member;

E. an actuator member pivotally mounted in the vehicle within the pedal member about the same axis as said pedal member, and including guide means for receiving the cable;

F. means defining a toothed surface on said actuator member and a complementary toothed surface on said adjusting member in juxtaposition therewith, the complementary toothed surfaces being fully engaged to axially fix said cable with respect to said pedal and actuator member upon certain pivotal movement of said pedal member toward a position effecting disengagement of said clutch and said toothed surfaces being less than fully engaged upon certain pivotal movement of said pedal member toward a position effecting engagement of the clutch; and G. stop means on the vehicle engageable with the actuator member for limiting separating movement between the complementary toothed surfaces, whereby axial movement of said cable with respect to said pedal and actuator members permits compensation for clutch wear.

* * * * *